United States Patent [19]

Eden

[11] Patent Number: 5,672,133

[45] Date of Patent: Sep. 30, 1997

[54] BICYCLE GEARING SYSTEM

[76] Inventor: Tom Eden, 5116 Pine St., Omaha, Nebr. 68106

[21] Appl. No.: 728,149

[22] Filed: Oct. 9, 1996

[51] Int. Cl.$^6$ .................................................. F16H 59/00
[52] U.S. Cl. ................................... 474/81; 280/261
[58] Field of Search ........................ 474/78, 80, 81; 280/261

[56] References Cited

U.S. PATENT DOCUMENTS

| Re. 30,078 | 8/1979 | Harris | 280/236 |
|---|---|---|---|
| 550,629 | 12/1895 | Cowe | 474/78 |
| 573,230 | 12/1896 | Monkiewicz . | |
| 907,289 | 12/1908 | Robinson . | |
| 2,560,991 | 7/1951 | Schuricht . | |
| 4,164,153 | 8/1979 | Moritsch et al. | 74/217 B |
| 4,857,036 | 8/1989 | Romano | 474/80 |
| 5,356,348 | 10/1994 | Bellio et al. | 474/70 |
| 5,389,043 | 2/1995 | Hsu | 474/80 |
| 5,392,668 | 2/1995 | Nurnberger | 74/502.2 |

FOREIGN PATENT DOCUMENTS

| 1022188 | 3/1953 | France . |
|---|---|---|
| 458439 | 5/1950 | Italy . |
| 462888 | 4/1951 | Italy . |
| 86587 | 6/1936 | Sweden . |
| 195207 | 1/1938 | Switzerland . |
| 2252089 | 7/1992 | United Kingdom . |

*Primary Examiner*—Roger J. Schoeppel
*Attorney, Agent, or Firm*—Adam H. Jacobs

[57] ABSTRACT

In combination, a bicycle having a frame and front and rear wheels and a bicycle gearing system which includes a movable bottom bracket mounted on the frame of the bicycle. A pedal axle is rotatably mounted in the bottom bracket. A chain extends between the front gear sprocket and a selected one of the rear gear sprockets. A rear derailleur is mounted on the frame generally adjacent and forward of the rear gear sprockets, the rear derailleur operative to engage the chain and shift the chain transversely relative to the frame. The chain is of a size and shape such that when the bottom bracket is in a forward position, the chain is tensioned, and when the bottom bracket is in the rearward position, the chain is detensioned. The chain is detensioned and the rear derailleur shifts the chain transversely relative to the frame such that the chain engages a different selected one of the rear gear sprockets. The movable bottom bracket is then returned to the forward position thereby retensioning the chain and retaining the chain on the different selected one of the rear gear sprockets.

11 Claims, 4 Drawing Sheets

BICYCLE GEARING SYSTEM

BACKGROUND OF THE INVENTION

1. Technical Field

This invention is directed to a bicycle gearing system and, more particularly, to a bicycle gearing system to be mounted on a bicycle having a frame and front and rear wheels, the gearing system including a movable bottom bracket movably mounted on the frame of the bicycle with the pedal axle extending transversely therethrough, at least one front gear sprocket and at least two rear gear sprockets connected by a chain for driving the rear wheel of the bicycle, a rear derailleur for transversely shifting the line of travel of the chain to select a different rear sprocket, the shifting of gears being accomplished by detensioning the chain by moving the bottom bracket rearward, transversely shifting the position of the chain with the rear derailleur and retensioning the chain by moving the bottom bracket forward thus securing the chain on the newly selected rear sprocket.

2. Description of the Prior Art

When the bicycle was first invented, the early bicycles were constructed with a single front sprocket and single rear sprocket connected by a chain. The front sprocket was rotated by force applied to crank pedals, the force then being transmitted to the rear sprocket by means of the chain. While a gearing system as thus described was acceptable for travel at relatively slow speeds and over level ground, the single ratio gear system was not acceptable for travel in areas having hills or for travel at higher speeds. Thus was conceived the multi-speed bicycle.

The most common form for the multi-speed bicycle, as shown in the prior art example of FIG. 6, includes one or more front sprockets having different diameters and a rear gear cassette consisting of three to seven differently sized rear sprockets. A chain extends around the front sprockets and around the rear sprockets, and further extends around a pivoting takeup wheel adjacent the rear gear cassette. The takeup wheel acts to tension the chain regardless of which gear is currently being used. Switching of the gears is done by means of a derailleur system which shifts the chain transversely relative to the frame of the bicycle to engage the front and rear sprockets depending on the gear desired by the user of the bicycle.

The standard gear system on a bicycle, while effective in switching gears, also includes numerous inefficient elements which act to reduce the efficiency of the gearing system, thus rendering the bicycle harder to pedal. The most flagrant element for inefficiency is the takeup wheel which tensions the chain to secure the chain on the front and rear gears. The constant tensioning increases the friction of the chain on the gears and on the takeup wheel itself, resulting in the efficiency loss as previously described. Furthermore, the inclusion of the takeup wheel in the gearing system requires the chain to be of substantially greater length than would be used if the front and rear sprockets were connected directly to one another, thus increasing the weight of the bicycle and the opportunity for failure of the chain. It is therefore desirable to eliminate the takeup wheel while retaining the gear shifting ability of the gearing system.

Various methods have been proposed in the past to address retention of the different gearing ability with removal of the takeup wheel. Italian, 458,439, Italian 462, 888 and Great Britain, 2,252,089, all disclose gearing systems for bicycles in which the rear section of the frame pivots about a pivot axle adjacent the top or base of the frame to bring the front or rear gears towards one another for shifting of the gears. It is clear, however, that modification of the weight-bearing sections of the bicycle frame to include pivot points or the like has the potential for failure and in any event increases the danger in riding the bicycle due to the moveable nature of the frame. Therefore, while the three above-cited patents do eliminate the takeup wheel, each of them is unacceptable for various other reasons.

Lowe, U.S. Pat. No. 550,629, discloses a crank-shaft bearing capable of moving slightly towards the rear wheel to loosen the chain for placing the chain on a small sprocket and then moving the crank-shaft forward until the chain is sufficiently taut. While Lowe does disclose a gearing system which eliminates the takeup wheel by including a crank-shaft, Lowe cannot be shifted while the bike in motion instead requiring that the user of the bicycle get off of the bike, loosen the position securement mechanism for the crank-shaft, adjust the position of the crank-shaft to correspond to the new desired location, remove the chain from the rear gear on which it was previously placed and reset the chain on the newly selected gear, re-secure the securement mechanism for the crankshaft, climb back aboard the bike and resume travel. Therefore, Lowe, while disclosing a gearing system which removes the takeup wheel from the system, actually presents a much more inefficient gear switching system than those presently found in the prior art.

Various other types of gearing systems have been proposed in the prior art, including those disclosed in Bellio, et al., U.S. Pat. No. 5,356,348, Monkiewicz, U.S. Pat. No. 573,230, and Nurenberger, U.S. Pat. No. 5,392,668, but none of the gearing systems disclosed in the prior art fully address and correct the inefficiencies found in the present day bicycle gearing systems. There is therefore a need for a bicycle gearing system which is substantially more efficient and trouble free than those devices found in the prior art.

Another problem with many of the gearing systems found in the prior art is that they do not lend themselves for use with recumbent or semi-recumbent bicycles which are presently growing in popularity. In a recumbent bicycle, the seat is usually found over or adjacent the rear wheel with the pedals placed in front of the seat such that when the bike is being ridden, the person riding is in a sitting, generally horizontal position. Because of the greater length of chain required to extend the drive system from the pedals to the rear wheel, inefficiencies in the gearing system are even more noticeable and therefore, it becomes even more vital to provide a more efficient gearing system for use with recumbent bikes.

Finally, it is medically proven that repetitive motion of any kind by the body can result in aggravation and injury to those parts of the body which are being repetitively used. It has been suggested that slight movement in the location of the rotational axis of the pedal axle will act to substantially alleviate repetitive stress injuries and, therefore, it is recommended that the bottom bracket of the bicycle have some degree of "float" built into the bracket. At present, the prior art does not disclose such a floating bottom bracket and therefore this problem has not been addressed. There is therefore a need for a bicycle which includes a gearing system having a floating bottom bracket to alleviate repetitive stress injuries.

Therefore, an object of the present invention is to provide an improved bicycle gearing system.

Another object of the present invention is to provide a gearing system for a bicycle having a frame and front and rear wheels, the gearing system including a movable bottom bracket movably mounted on the frame of the bicycle, the bottom bracket rotatably mounting a pedal axle therein on which is mounted at least one front circular gear sprocket. At least two rear circular gear sprockets having different diameters are concentrically mounted adjacent the rear wheel and a chain extends between the front and rear gear sprockets such that the rear sprocket may be driven by rotation of the front sprocket. The gear of the gearing system may be changed by detensioning the chain by sliding the bottom bracket rearwards towards the rear sprockets and then transversely moving the chain by means of a rear derailleur to engage a different rear sprocket, then retension the chain by sliding the bottom bracket forward.

Another object of the present invention is to provide a bicycle gearing system which is free of any takeup wheels or the like, thereby increasing the efficiency of the bicycle gearing system.

Another object of the present invention is to provide a bicycle gearing system which the bottom bracket is movably mounted, thus allowing the bottom bracket to "float" and acting to reduce the incidence of repetitive stress injuries.

Finally, an object of the present invention is to provide a bicycle gearing system which is simple (i.e. has fewer moving parts) and is more durable in construction and manufacture than those devices found in the prior art and furthermore is safe and efficient in use.

SUMMARY OF THE INVENTION

The present invention provides, in combination, a bicycle having a frame and front and rear wheels rotatably mounted thereon and a bicycle gearing system which includes a movable bottom bracket movably mounted on the frame of the bicycle, the bottom bracket being movable between at least one forward position and at least one rearward position, the bottom bracket free of securement devices operative to immovably fix the bottom bracket in one position, thereby allowing the bottom bracket to "float." A pedal axle is rotatably mounted in the bottom bracket and extends transversely through the frame and crank arms are mounted on the pedal axle for rotating the axle. At least one front circular gear sprocket is mounted on, generally perpendicular to and concentric with the pedal axle. At least two rear gear sprockets having different diameters are each mounted concentrical with one another adjacent the rear wheel on either the rear wheel or the frame generally parallel with the front gear sprocket, the rear gear sprockets being operatively connected to the rear wheel for transference of rotational force thereto.

A chain extends between the front gear sprocket and a selected one of the rear gear sprockets for transferring rotational force applied to the crank arms and the front gear sprocket to a selected one of the rear gear sprockets and thus to the rear wheel. A rear derailleur is mounted on the frame generally adjacent and forward of said rear gear sprockets, the rear derailleur operative to engage the chain and shift the chain transversely relative to the frame such that the chain may be moved to engage a different rear gear sprocket thereby shifting gears. The chain is of a size and shape such that when the bottom bracket is in a forward position, the chain is tensioned thereby retaining the chain on the front gear sprocket and the selected one of the rear gear sprockets and when the bottom bracket is in the rearward position, the chain is detensioned. The bicycle gearing system is operative to shift gears upon the movable bottom bracket being moved to one of the rearward positions thereby detensioning the chain. The rear derailleur is used to shift the chain transversely relative to the frame such that the chain engages a different selected one of the rear gear sprockets. The movable bottom bracket is then returned to the forward position thereby retensioning the chain and retaining the chain on the different selected one of the rear gear sprockets.

It is clear that the above-described invention provides a substantial improvement over those devices found in the prior art. For example, the elimination of the takeup wheel greatly increases the efficiency of the present gearing system as opposed to those found in the prior art. Moreover, because the sophisticated derailleur systems found in the prior art are eliminated by the present invention, there is much less opportunity for mechanical breakdown of the present gearing system. Also, the slight forward and rearward movement of the pedal axle has proven beneficial to the body, as repetitive motion can cause degradation of joint, muscle and bone structures. Finally, it is believed that the gearing system of the present invention provides a novel, safe, efficient and enjoyable system for switching gears which is disclosed nowhere in the prior art.

DESCRIPTION OF THE PREFERRED EMBODIMENT

Figure 1:
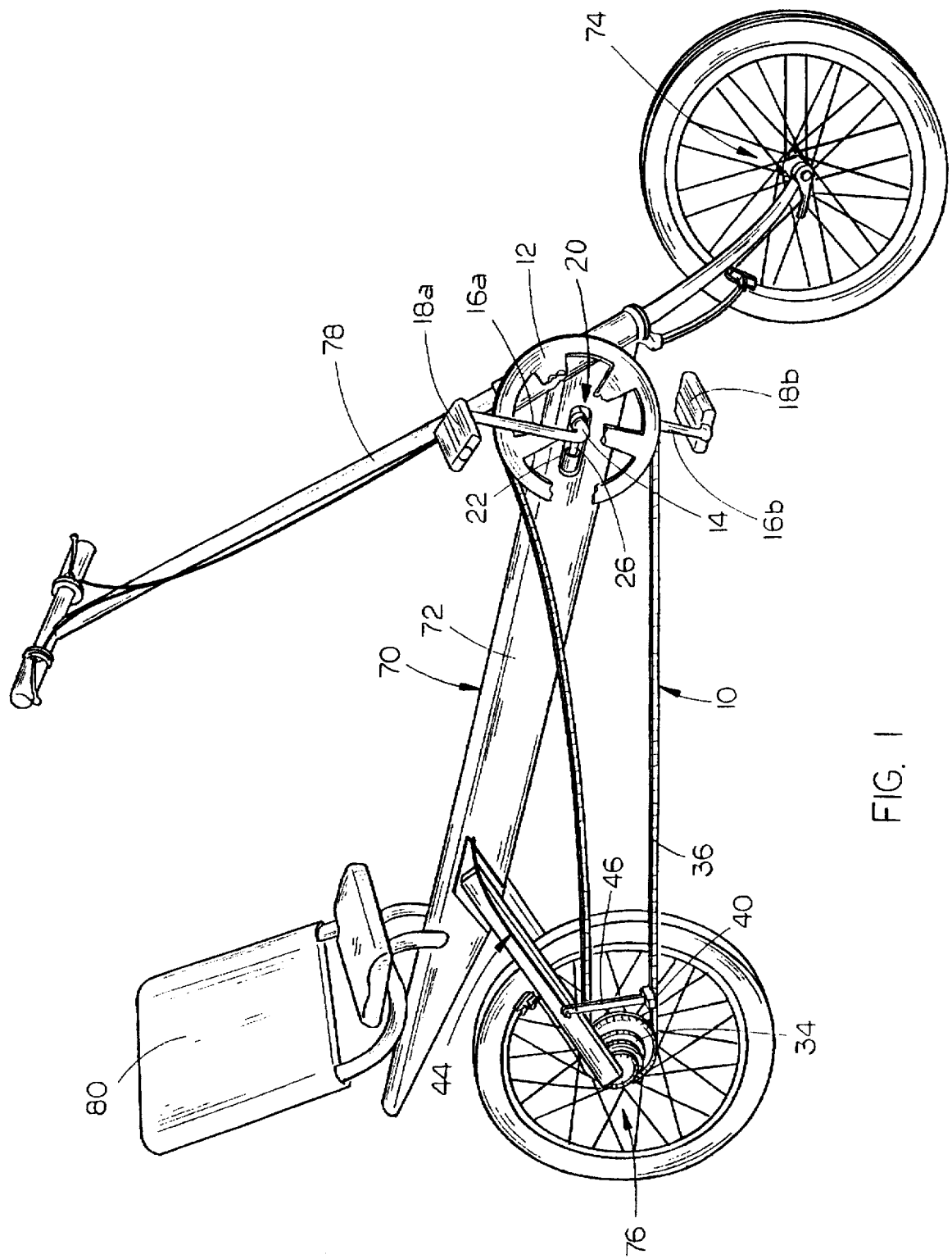
FIG. 1 is a perspective view of a recumbent bicycle having the gearing system of the present invention mounted thereon.

The bicycle gearing system 10 of the present invention is best shown in FIGS. 1–4c as being mounted on a recumbent bicycle 70 which includes main frame unit 72, a front wheel and wheel strut assembly 74, a rear wheel and rear strut assembly 76, steering mechanism 78 and a bicycle seat 80. Of course, it is to be understood that the bicycle gearing system 10 of the present unit may be used on any type of bicycle be it recumbent or otherwise.

The bicycle gearing system 10 includes a front circular gear sprocket 12 mounted on a pedal axle 14 which extends through the main frame 72 of the bicycle 70. Mounted on the pedal axle 14 and extending generally perpendicular thereto are a pair of pedal axle crank arms 16a and 16b which include pedals 18a and 18b affixed to the ends thereof. The front gear sprocket assembly is thus substantially similar to those front gear sprocket assemblies presently found in the prior art.

Figure 2:
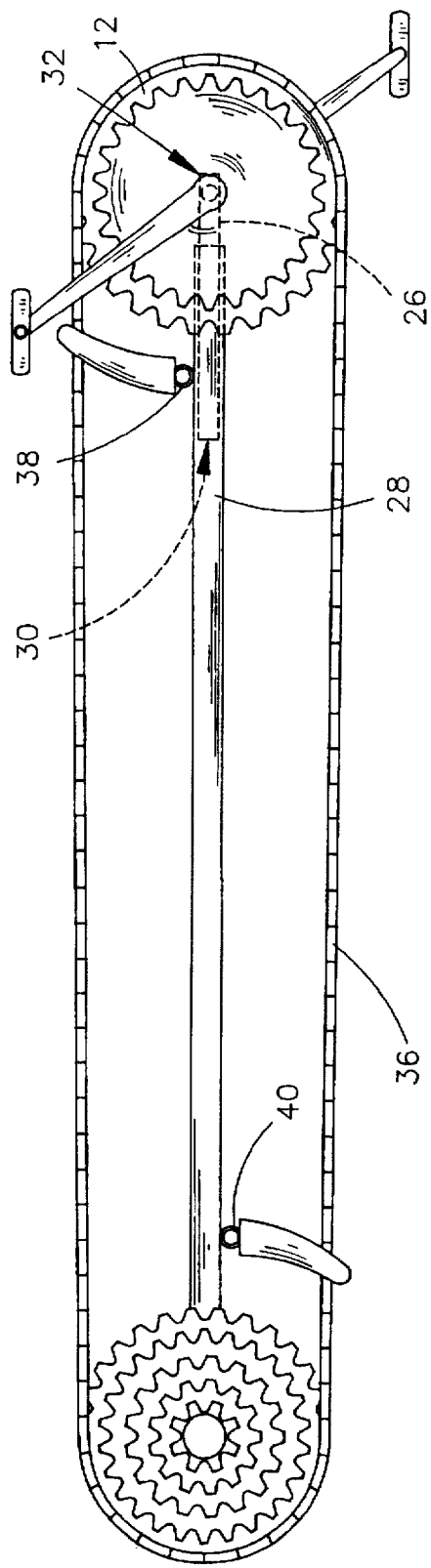
FIG. 2 is a side elevational of the gearing system of the present invention.
Figure 3:
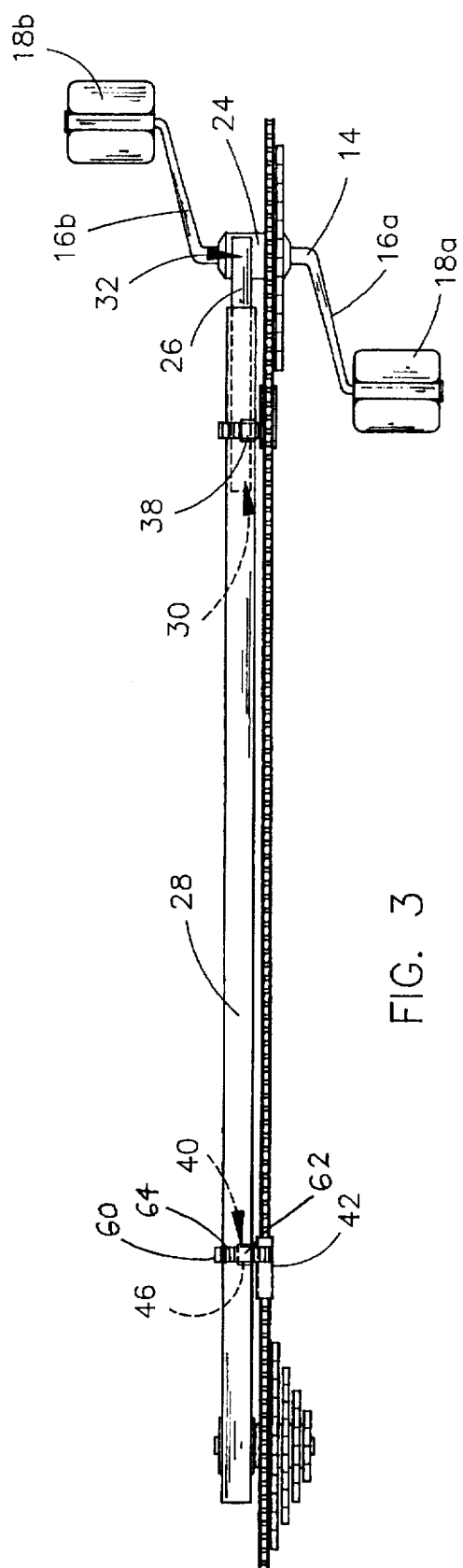
FIG. 3 is a top plan view of the gearing system of the present invention.

The pedal axle 14 is movably mounted on the frame 72 in a movable bottom bracket 20 which allows the pedal axle 14 to be slid forwards and rearwards on the frame 72 between a forward position and rearward position. In the preferred embodiment, the movable bottom bracket 20 is constructed as an extended longitudinal slot 22 formed in main frame 72 through which pedal axle 14 extends transversely. The slot 22 has a forward end and a rearward end. Slidably housed within slot 22 and frame 72 is a pedal axle carriage 24 which rotatably mounts and secures the pedal axle 14 within the longitudinal slot 22. The pedal axle carriage 24 may be mounted in frame 72 by any appropriate sliding means, but in the preferred embodiment the pedal axle carriage 24 would be mounted on the forward end 32 of a longitudinally mounted projecting rod 26 as shown in FIGS. 2 and 3. Rod 26 is slidably mounted within sleeve 28, sleeve 28 having an internal diameter slightly greater than the external diameter of rod 26 and sleeve 28 being fixably mounted within frame 72 generally parallel with the longitudinal axis of the frame 72. It is preferred that sleeve 28 be at least partially filled with a type of hydraulic fluid and that the inner end 30 of rod 26 be flared outwards to prevent rod 26 from exiting sleeve 28. The outer end of the sleeve 28 will preferably taper inwards to form a fluid-tight seal with rod 26 thus preventing hydraulic fluid held within sleeve 28 from leaking out of sleeve 28. The hydraulic fluid held within sleeve 28 is preferably pressurized in order to force rod 26 forwards relative to sleeve 28, thus movably securing the pedal axle carriage 24 adjacent the forward end of longitudinal slot 22. The pedal axle carriage 24 has substantially the same diameter dimension as the vertical height of longitudinal slot 22 such that when the pedal axle carriage 24 slides within longitudinal slot 22, vertical movement of pedal axle carriage 24 is substantially prevented as is transverse movement of pedal axle carriage 24 thereby restricting movement of pedal axle carriage 24 to generally horizontal longitudinal movement parallel with the longitudinal axis of longitudinal slot 22.

It is preferred that the hydraulic force pressing on rod 26 within sleeve 28 be relatively small in order to allow rearward movement of the pedal axle carriage 24 in response to rearward force applied to the pedals 18 and thereby to the pedal axle carriage 24 by the operator of the bicycle 70. The purpose of the rearward movement of pedal axle carriage 24 will be explained later in this disclosure.

Of course, the movable bottom bracket as thus described may be modified in various ways yet still accomplish the same intended function. For example, on the recumbent bicycle 70 shown in FIG. 1, the pedal axle 14 could be slidably mounted above or below the frame 72 as opposed to forming a slot 22 therein. Virtually any slidable bracket could be used to secure the axle 14 on the frame 72 so long as the bracket would prevent vertical motion of the axle 14 but allow longitudinal motion generally parallel with the longitudinal axis of the frame 72. When the sliding bottom bracket is moved higher or lower on the frame, the performance characteristics of the bicycle are modified. Specifically, when the pedal axle 14 is positioned lower on the frame 72, the center of gravity for the bicycle is likewise lowered, thus resulting in a more stable platform for the rider. However, the lower position of the pedal axle 14 does decrease the performance capabilities of the bicycle in that the rider cannot generate as much torque. Conversely, positioning of the pedal axle 14 higher on the frame 72 will increase performance but decrease stability.

Mounted adjacent the rear wheel 76 of the bicycle 70 is rear gear cassette 34 which, in the preferred embodiment, consists of a plurality of concentrically mounted gear sprockets each having different diameters, as shown best in FIG. 2. The rear gear cassette 34 used in the present invention would preferably be of a type commonly used on bicycles found in the prior art, with the rear gear cassette 34 concentrically mounted with and connected directly to the rear axle of the bicycle in order to provide propulsive force to the rear wheel 76 of the bicycle 70. Also, although FIGS. 2 and 3 disclose a rear gear cassette 34 having five gear sprockets, it is also known in the art to provide multiple gear rear cassettes having various numbers of sprockets depending on the needs of the operator of the bicycle 70.

Extending between front gear sprocket 12 and rear gear cassette 34 is a chain 36 which transfers rotational force applied to the front gear sprocket 12 via pedal axle crank arms 16a and 16b to the rear gear cassette 34 in order to drive rear wheel assembly 76 thereby propelling the bicycle 70 forward. The length of chain 36 is determined by the distance between the rear gear cassette 34 and front gear sprocket 12. The exact length of chain 36 is determined when chain 36 is placed on the smallest gear sprocket on rear gear cassette 34 and the smallest front gear sprocket 12, the length of chain 36 allowing pedal axle carriage 24 to be positioned adjacent the forward edge of longitudinal slot 22 when the chain 36 is tensioned. Chain 36 is retained on front gear sprocket 12 and rear gear cassette 34 by the tension provided by the combination of the longitudinal projecting rod 26 and sleeve 28 and the hydraulic pressure exerted on the rod 26 thereby forcing pedal axle carriage 24 forward. It may be preferable to reduce the length of chain 36 to prevent pedal axle carriage 24 from contacting the forward edge of longitudinal slot 22 to allow for movement of the pedal axle carriage 24 without frictional contact with the forward edge of longitudinal slot 22, thereby reducing wear and tear on the frame 72. Of course, chain 36 may be constructed of various materials, but most commonly will consist of a standard link-type metal chain.

To shift the chain from one gear sprocket to another, a pair of derailleur units 38 and 40 are mounted on the frame 72, front derailleur 38 mounted adjacent to and rearwards of the front gear sprocket 12 and rear derailleur 40 mounted adjacent to and forwards of rear gear cassette 34. It is preferred that the front and rear derailleurs 38 and 40 each be of the same type, and therefore the following description of rear derailleur 40 should be understood to apply to front derailleur 38.

Rear derailleur 40, as shown in FIGS. 1–4c, includes a chain-surrounding cage 42 through which the chain 36 passes. Cage 42 is movably mounted on the frame 72 of the bicycle 70 such that the cage 42 may be moved parallel with the transverse axis of the frame 72 thereby shifting the line of travel of the chain 36 to correspond with a selected one of the rear gear sprockets on rear gear cassette. Movement of the cage 42 along the transverse axis is accomplished by a standard cable connection and handle 44 and frame mount 46 as is well-known in the prior art, although use of other cage movement devices such as solenoid shifters or the like is also contemplated.

As shown best in FIG. 3, the frame mount 46 of the rear derailleur 40 includes a rod 60 and sleeve 62 combination in which rod 60 slides within sleeve 62 to move the cage 42 transversely relative to the frame 72. This is a standard type of derailleur setup, however, the present invention modifies the rod 60 to further include a plurality of spaced-apart notches 64 formed extending into the rod 60. These notches 64 are engaged by a tensioned tooth (not shown) housed within the sleeve 62 such that when the rod 60 is moved to shift the position of the cage 42, the tooth engages the next notch 64 along the rod 60 thus releasably securing the rod 60 in one particular position. The cage 42 is thus also releasably secured in one particular position. The notches 64 are preferably formed in rod 60 such that when the tooth engages a notch 64, the cage 42 is aligned with a particular one of the gear sprockets on the rear gear cassette 34. The notches 64 will thus correctly align the cage 42 with the desired gear sprocket, therefore aligning the chain 36 and preventing contact between the chain 36 and the cage 42 once the chain 36 is seated on the selected gear sprocket.

It is preferred that the cage 42 be of a size and shape to preclude contact with the chain 36 at all times other than when the chain 36 is being shifted to another gear sprocket. This absence of contact will further enhance the efficiency aspect of the present invention by further lowering the amount of frictional contact the gearing system 10 encounters.

Figure 4A:
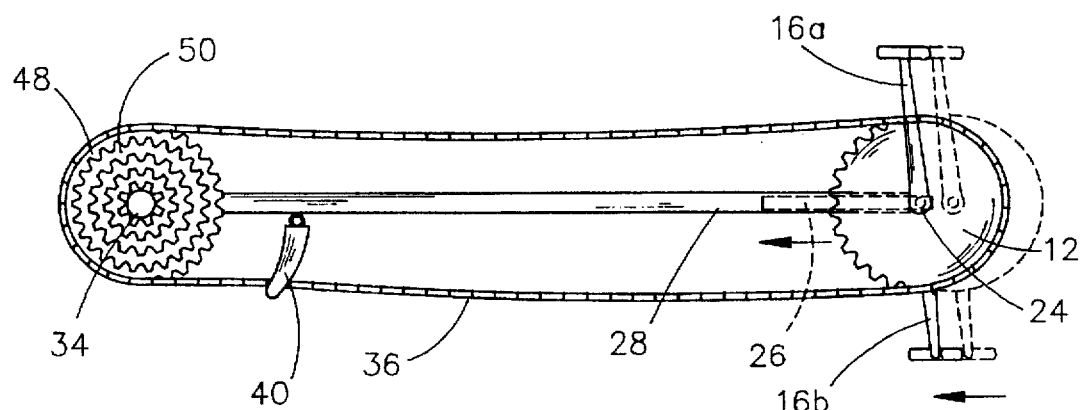
FIGS. 4a, 4b and 4c sequentially show the gear shifting mechanism of the present invention being used to shift the gears on the rear cassette of a bicycle.
Figure 4B:
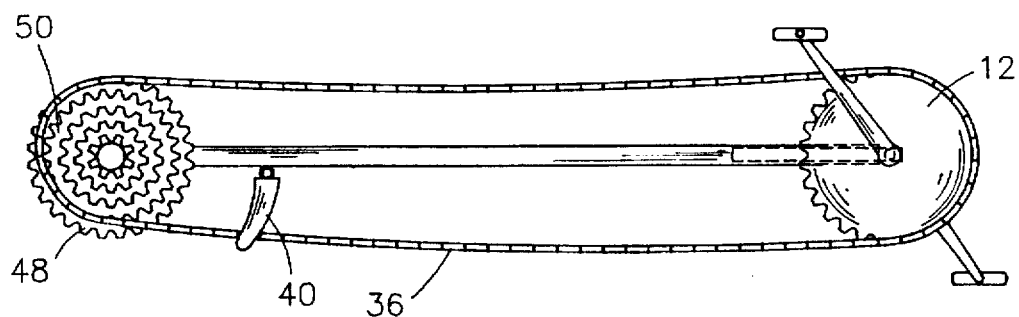
Figure 4C:
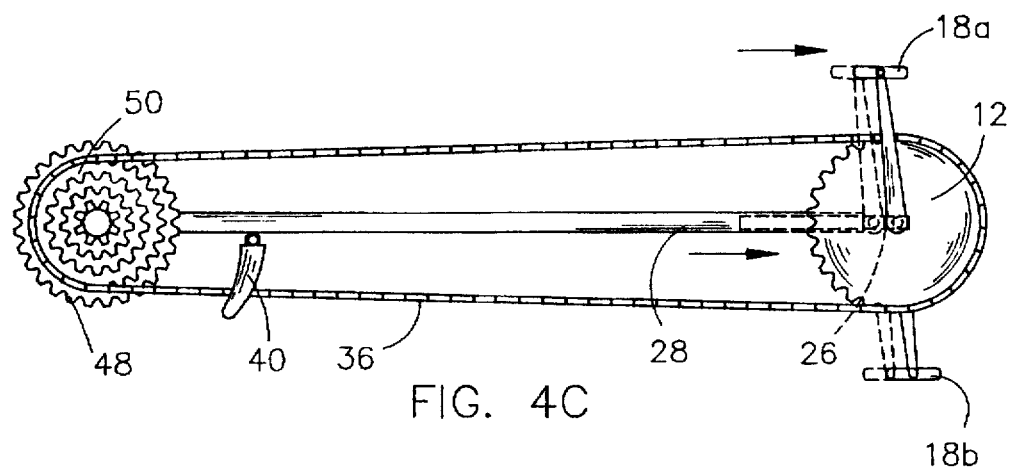

FIGS. 4a, 4b and 4c show how the gearing system 10 of the present invention shifts the chain 36 between the rear gear sprockets. It is to be understood that the method by which the front gear sprockets are changed would be substantially the same, and therefore the following description also pertains to the front derailleur 38 and front gear sprocket 12.

To shift the chain 36 between rear gear sprockets, the operator of the bicycle 70 first must detension the chain 36. As shown in FIG. 4a, the pedal axle carriage 24 is moved towards the rear gear cassette 34 by application of rearward force to the pedals 18a and 18b. This rearward force causes rod 26 to move into sleeve 28, thus decreasing the distance between the pedal axle 14 and the rear gear cassette and detensioning the chain 36. At this stage, the chain 36 is still engaging the first rear gear sprocket 48, which is shown as the sprocket having the greatest diameter in FIG. 4a.

FIG. 4b shows the chain 36 after detensioning. The rear derailleur 40 is then moved to reposition the chain 36 on a second selected gear sprocket 50. Because of the presence of the notches 64 on the rod 60 of the frame mount 46, the cage 42 may be precisely aligned with the selected gear sprocket. Once the cage 42 of the rear derailleur is transversely shifted, the operator must resume pedaling to seat the chain 36 on the newly selected gear sprocket 50. When the rearward tension on the pedals 18a and 18b is released, the pedal axle carriage 24 is moved forwards by the hydraulic force applied to the rod 26 due to the hydraulic fluid within sleeve 28. The chain 36 is thus retensioned and as the pedal axle crank arms 16a and 16b are rotated, the chain 36 is seated on the second rear gear sprocket 50, as shown in FIG. 4c. It is clear that the shifting process thus described is much more efficient and simple than those shifting mechanisms found in the prior art.

Figure 5:
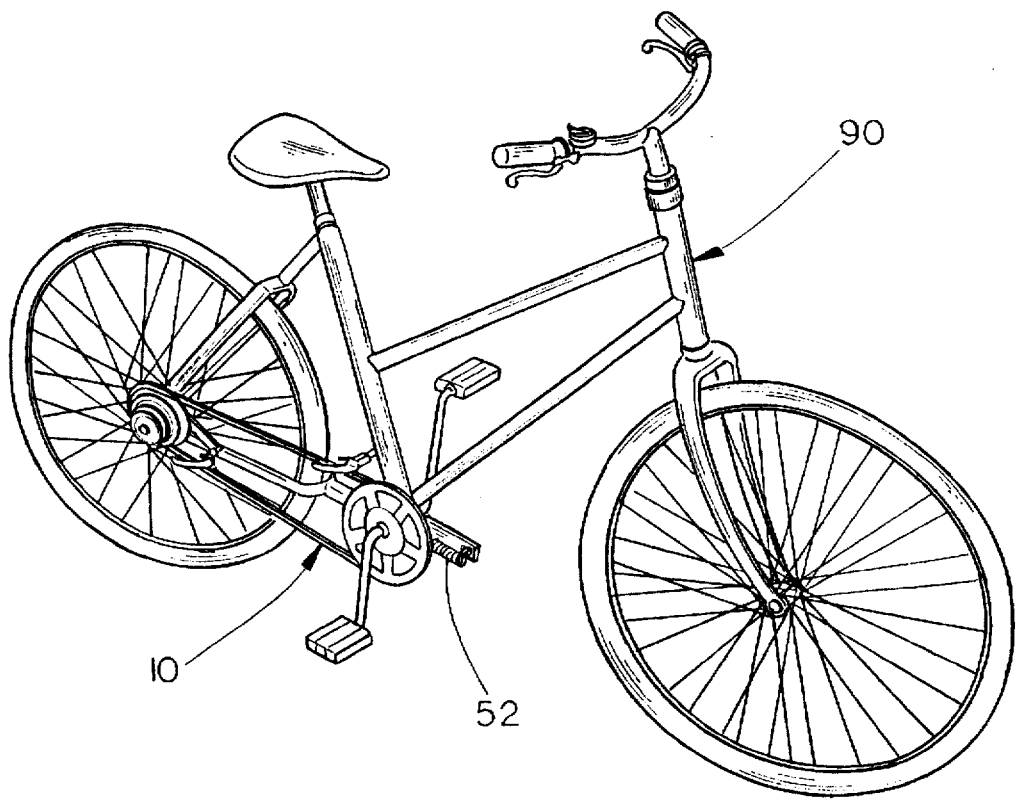
FIG. 5 shows the gearing system of the present invention mounted on a standard bicycle.
Figure 6:
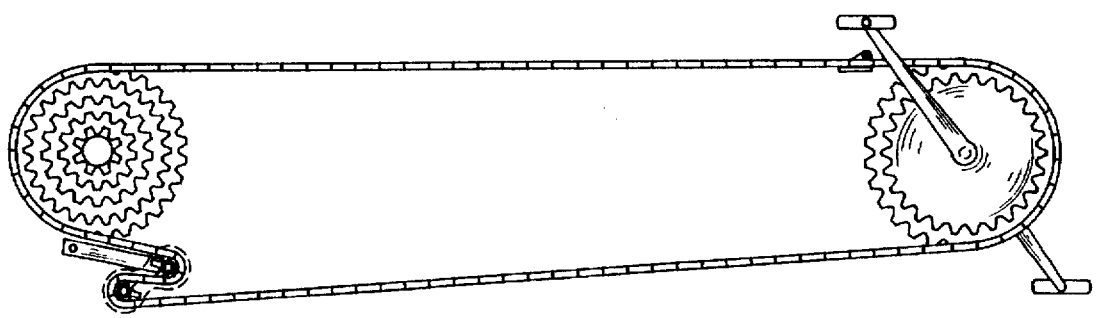
FIG. 6 discloses a gearing system found in the prior art.

It is to be understood that numerous modifications, substitutions and additions may be made to the present invention which fall within the intended broad scope of the appended claims. For example, the gearing system 10 may be used on any type of bicycle, as shown in FIG. 5, although it is perhaps best suited for use on a semi-recumbent or recumbent bicycle. Likewise, the tensioning device described above relying on hydraulics may be replaced by any suitable tensioning device such as a spring 52, as shown in FIG. 5. The arrangement and dimensions of the invention as described above also may be varied, so long as the basic functionality of the invention remains intact.

There has thus been shown and described a bicycle gearing system which accomplishes at least all of the stated objectives.

I claim:

1. In combination:

a wheeled vehicle having a frame and front and rear wheels rotatably mounted thereon; and a gearing system comprising:

a movable bottom bracket movably mounted on said frame of said wheeled vehicle, said bottom bracket movable between at least one forward position and at least one rearward position, said bottom bracket free of securement means operative to immovably fix said bottom bracket in one position;

a pedal axle rotatably mounted in said bottom bracket and extending transversely to said frame;

crank means mounted on said pedal axle for rotating said axle;

at least one front circular gear sprocket mounted on, generally perpendicular to and concentric with said pedal axle;

at least two rear circular gear sprockets each having a different diameter, each mounted concentrically with one another adjacent said rear wheel on one of said rear wheels and said frame generally parallel with said front gear sprocket, said rear gear sprockets operatively connected to said rear wheel for transference of rotational force thereto;

chain means extending between said front gear sprocket and a selected one of said rear gear sprockets for transferring rotational force applied to said crank means and said front gear sprocket to said selected one of said rear gear sprockets thereby rotating said rear wheel;

a rear derailleur means mounted on said frame generally adjacent to and forward of said rear gear sprockets, said rear derailleur means operative to engage said chain means and shift said chain means transversely relative to said frame such that said chain means is moved to engage a different rear gear sprocket thereby shifting gears;

said chain means being of a size such that when said bottom bracket is in said forward position, said chain means is tensioned thereby retaining said chain means on said front gear sprocket and a selected one of said rear gear sprockets, and when said bottom bracket is in said rearward position, said chain means is detensioned; and said gearing system operative to shift gears upon said movable bottom bracket being moved to one of said rearward positions thereby detensioning said chain means, said rear derailleur means operative to shift said chain means transversely relative to said frame such that said chain means engages a different selected one of said rear gear sprockets, said movable bottom bracket being moved forwardly thereby retensioning said chain means and retaining said chain means on said different selected one of said rear sprockets.

2. The combination of claim 1 further comprising forward biasing means operatively connected to said movable bottom bracket for biasing said bottom bracket towards said at least one forward position whereby said chain means is tensioned to retain said chain means on said front gear sprocket and a selected one of said rear gear sprockets.

3. The combination of claim 2 wherein said forward biasing means comprises a spring extending between and connected to said frame and said bottom bracket.

4. The combination of claim 1 wherein said movable bottom bracket comprises a longitudinally extended slot having a forward end and a rearward end, said slot formed in said frame of said bicycle and a pedal axle carriage slidably mounted within said slot, said pedal axle rotatably mounted on said pedal axle carriage such that said pedal axle extends transversely through said frame, said pedal axle carriage operative to permit longitudinal movement of said pedal axle within said slot.

5. The combination of claim 4 further comprising forward biasing means operatively connected to said pedal axle carriage for biasing said pedal axle carriage towards said forward end of said slot, said forward biasing means comprising an hydraulic biasing system including a generally cylindrical sleeve mounted on said frame rearwards of said pedal axle carriage and a generally cylindrical rod slidably housed within said sleeve and extending forwards therefrom, a forward end of said rod connected to said pedal axle carriage, and hydraulic fluid held within said sleeve for forwardly biasing said rod relative to said sleeve, thereby forwardly biasing said pedal axle carriage towards said forward end of said slot.

6. The combination of claim 1 wherein said rear derailleur means comprises a chain-surrounding cage, shift handle, cable connection and frame mount means.

7. The combination of claim 6 wherein said frame mount means comprises a transversely extending rod slidably housed within a frame mounted sleeve, said cage mounted on one end of said rod, said rod connected at the other end to said cable connection, said rod further including a plurality of spaced-apart notches formed extending into said rod, said notches being engaged by a notch-engaging device for releasably securing said rod in a selected one position whereby said cage of said rear derailleur is aligned with a selected one of said rear gear sprockets thereby preventing frictional contact between said chain means and said cage after one of said rear gear sprockets is selected.

8. The combination of claim 1 further comprising at least two front circular gear sprockets and a front derailleur means mounted on said frame generally adjacent to and rearward of said front gear sprockets, said front derailleur means operative to engage said chain means and shift said chain means transversely relative to said frame such that said chain means is moved to engage a different front gear sprocket thereby shifting gears.

9. The combination of claim 1 wherein said wheeled vehicle is a recumbent bicycle.

10. A method for shifting gears on a wheeled vehicle comprising the steps:

providing a wheeled vehicle having a frame and front and rear wheels rotatably mounted thereon having a gearing system including a movable bottom bracket movably mounted on said frame of said wheeled vehicle, said bottom bracket movable between at least one forward position and at least one rearward position and a pedal axle rotatably mounted in said bottom bracket and extending transversely to said frame;

providing crank means mounted on said pedal axle for rotating said axle, at least one front circular gear sprocket mounted on, generally perpendicular to and concentric with said pedal axle and at least two rear circular gear sprockets each having a different diameter, each mounted concentrically with one another adjacent said rear wheel on one of said rear wheel and said frame generally parallel with said front gear sprocket, said rear gear sprockets operatively connected to said rear wheel for transference of rotational force thereto;

providing chain means extending between said front gear sprocket and a selected one of said rear gear sprockets, a rear derailleur means mounted on said frame generally adjacent to and forward of said rear gear sprockets, said rear derailleur means operative to engage said chain means and shift said chain means transversely relative to said frame such that said chain means is moved to engage a different rear gear sprocket thereby shifting gears, said chain means being of a size such that when said bottom bracket is in said forward position, said chain means is tensioned thereby retaining said chain means on said front gear sprocket and a selected one of said rear gear sprockets, and when said bottom bracket is in said rearward position, said chain means is detensioned;

moving said bottom bracket towards said rearward position thereby decreasing the distance between said front gear sprocket and said rear gear sprockets and detensioning said chain means;

engaging and moving said rear derailleur means transversely relative to said frame to align said rear derailleur means with a newly selected one of said rear gear sprockets;

rotating said pedal axle and said front gear sprocket whereby said chain means is rotated about said front gear sprocket and said newly selected one of said rear gear sprockets, said chain means being seated on said newly selected one of said rear gear sprockets by said rear derailleur means being aligned with said newly selected one of said rear gear sprockets; and moving said bottom bracket towards said forward position thereby retensioning said chain means and seating said chain means on said newly selected one of said rear gear sprockets.

11. The method of claim 10 further comprising the step of providing forward biasing means operatively connected to said movable bottom bracket for biasing said bottom bracket towards said at least one forward position whereby said chain means is tensioned to retain said chain means on said front gear sprocket and a selected one of said rear gear sprockets.

* * * * *